Jan. 18, 1938. G. F. HUTCHINGS 2,105,738
TIRE PRESSURE INDICATOR
Filed Jan. 14, 1935  3 Sheets—Sheet 1

INVENTOR: George F. Hutchings,
BY Hugh K. Wagner,
ATTORNEY.

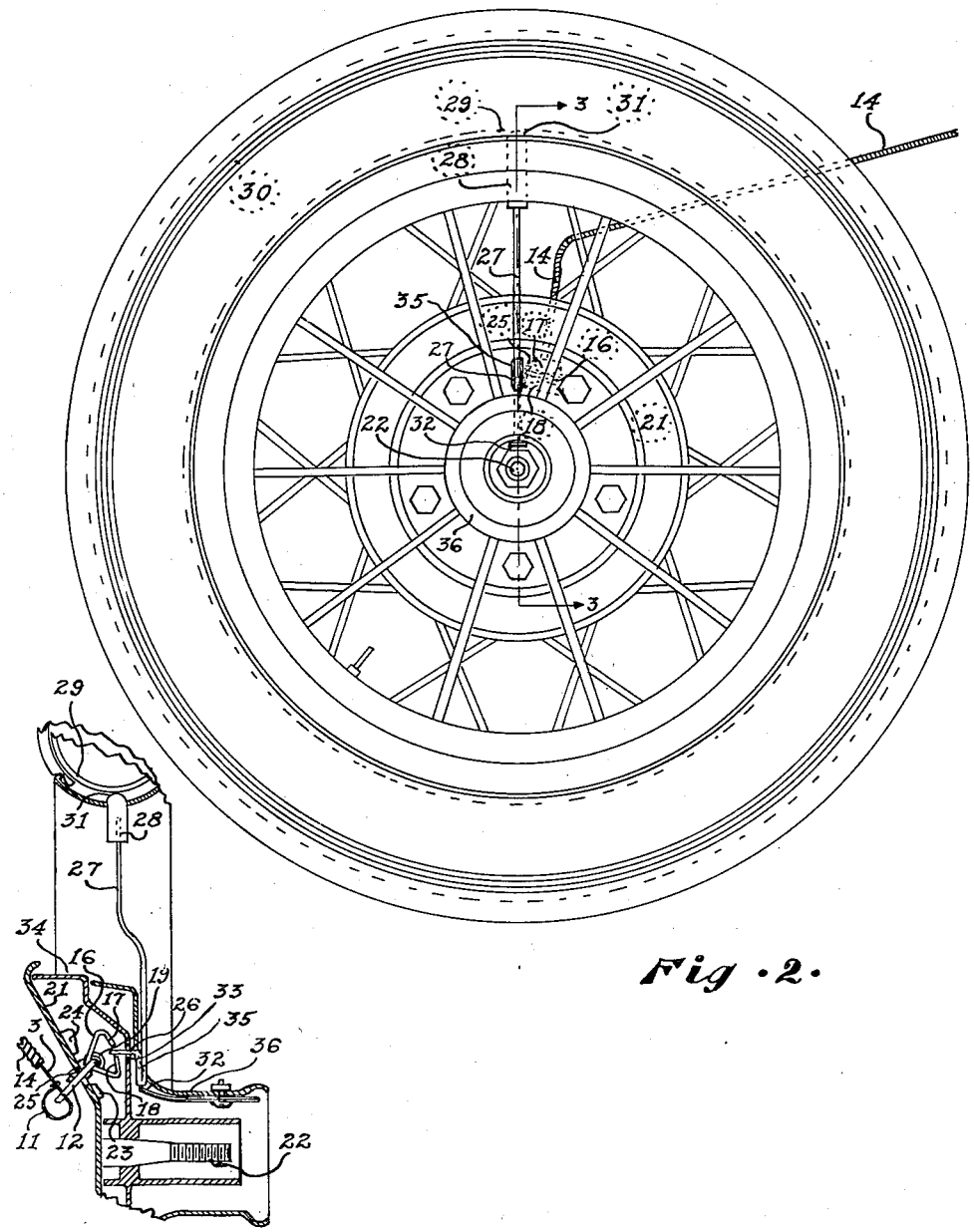

Jan. 18, 1938. G. F. HUTCHINGS 2,105,738
TIRE PRESSURE INDICATOR
Filed Jan. 14, 1935 3 Sheets-Sheet 3
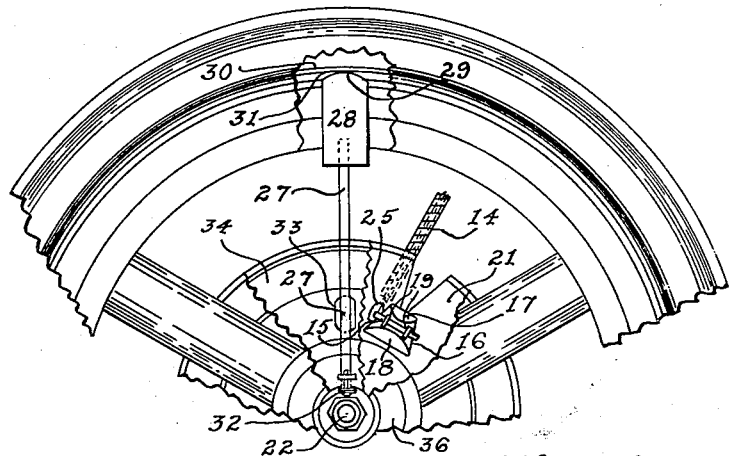
Fig. 4.
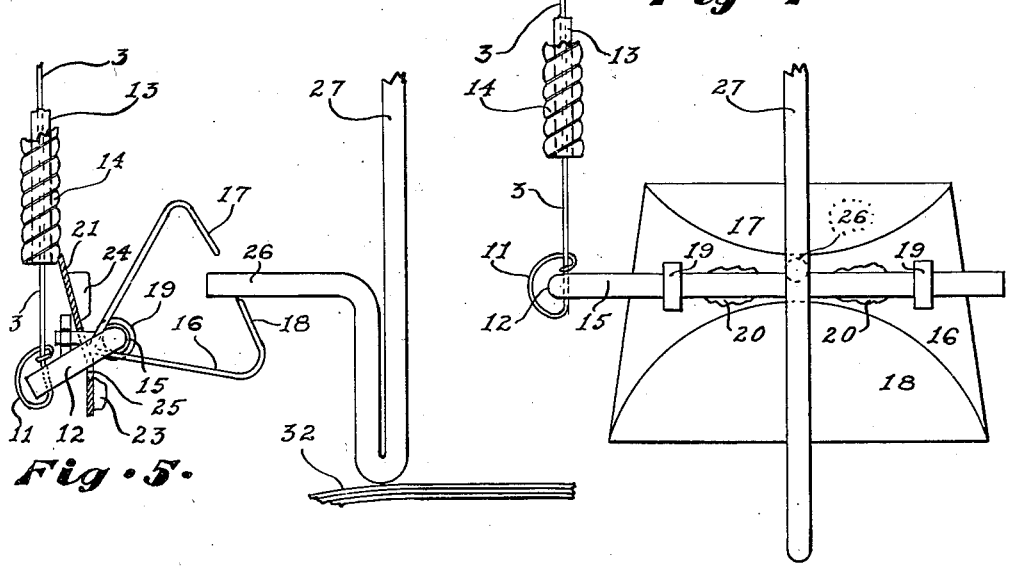
Fig. 5.
Fig. 6.
INVENTOR:
George F. Hutchings
BY
Hugh H. Wagner
ATTORNEY.

Patented Jan. 18, 1938

2,105,738

UNITED STATES PATENT OFFICE 2,105,738

TIRE PRESSURE INDICATOR

George F. Hutchings, St. Louis, Mo.

Application January 14, 1935, Serial No. 1,717

7 Claims. (Cl. 73—31)

This invention has for its object the provision of means, preferably mounted on the instrument-board of a motor vehicle, whereby the driver can at a glance see the amount of air-pressure in the tires of his machine.

Another object of this invention is to provide a mechanism for the said purpose that will be positive and accurate in operation, simple, cheap, and durable in its construction, and easily understood and applied.

Other features of invention will be found in the novel form and arrangement of the several parts.

In the accompanying drawings, forming part of this specification, and in which like parts are designated by like reference numbers wherever they occur, Fig. 1 is a front elevation, on an enlarged scale, of the tire-pressure scale or indicator mounted on the instrument-board.

Fig. 2 is an outside side elevation of a vehicle wheel, with a pneumatic tire mounted thereon, showing the position relative thereto of the element for taking the amount of air-pressure present in the inner tube and of certain connected parts and the means for transmitting that information to the device shown in Fig. 1.

Fig. 3 shows in elevation the construction of the said parts and their connection with the said transmitting means.

Fig. 4 is an elevation at a right-angle to Fig. 3 of some of the parts shown in Fig. 3.

Fig. 5 is an elevation on an enlarged scale of some of the parts shown in Fig. 3.

Fig. 6 is an elevation, on the same scale as Fig. 5, of the same parts, but taken at a right-angle thereto.

Figure 1:
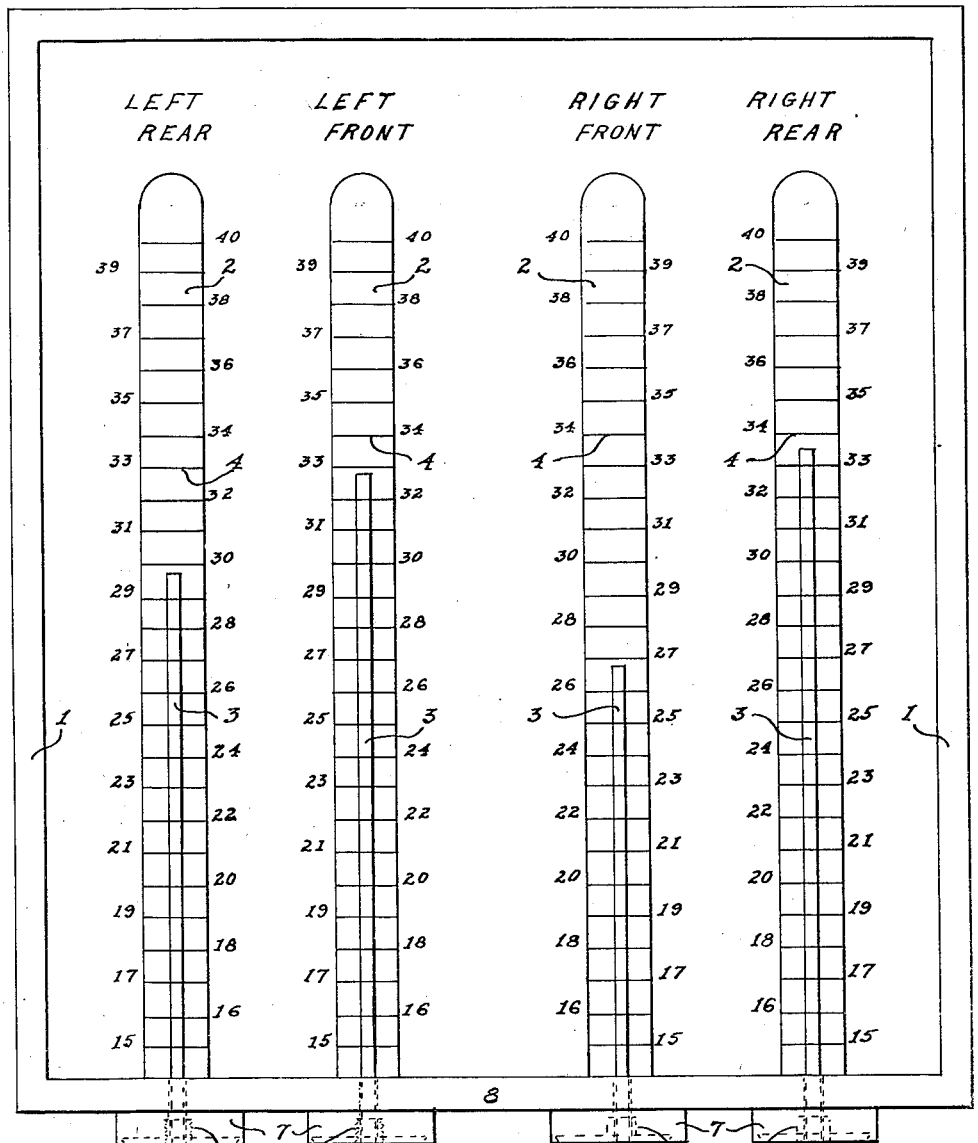

The casing or box 1 is preferably made of metal, and it and the parts within it and connected therewith are shown in Figure 1 are shown on a much enlarged scale as compared to the size in actual use or the other figures of the drawings. It is to be suitably mounted on the dashboard or instrument-board of an automobile, truck, or other motor vehicle or at any other place where it can be easily seen by the operator of the vehicle.

The tubes 2 are preferably transparent, but may be otherwise constructed so that the position of the wires 3 or other indicators therein may be observed with relation to the scales 4.

One such tube 2 and scale 4 is provided for registration and indication of air-pressure within each of the four wheels of the vehicle. The number of wheels determines the number of tubes 2, wires 3, and scales 4. Each wheel is provided with a device like that depicted in Figures 5 and 6.

The wires 3 extend through holes in the bottom 8 of casing 1 into tubes 2 and, by their position relative to the numbers on the scales 4 indicating pounds of air-pressure, show the amount of air-pressure in the respective tires.

From here on the description will be in the singular, but it is to be understood that it applies to each of the wheels and its attached device and to each of the indicators in casing 1. Casing 1 may be open face or not, as desired.

The wire 3 extends through and is attached to an externally threaded sleeve 5 on which a nut 10 is screwed. As shown, the nut 10 is supported by a swivel connection with the collar 7 and is rotative. When the nut 10 is rotated on the sleeve 5, said sleeve 5 and the wire 3 connected therewith are moved longitudinally so that the wire 3 within the tube 2 is raised or lowered and is thereby adjusted with respect to the scale. Such adjustment may be necessary on account of differences of altitude, temperature, climate, kind of rubber of which the inner tube is made, or other condition for which allowance must be made and provided for, in order to insure the maximum degree of precision and accuracy in a measurement of the air-pressure in the inner tube. Any other suitable adjusting device can be used.

The use of the tubes 2 in casing 1 is preferable, but not indispensable. Some other form of guide and scale may be employed.

The wire 3 extends from within the casing 1 to flexible or swiveled connection 11 with arm or projection 12. The wire 3 is preferably inclosed in a copper tube 13, which is preferably contained in protecting sheath 14 of flexible corrugated material, which will repel stones and other objects thrown against it underneath the car by the motion of the car or by other causes. The sheath 14 is preferably of material such as used in some electric wire cables.

Arm 12 is arranged at substantially a right-angle to shaft 15, to which is fixed a substantially V-shaped rocker 16, having lips 17 and 18. Shaft 15 rotates in eyes 19. Solder 20 may be used in firmly attaching shaft 15 to the rocking member 16, but fixation thereto may be accomplished in any desired manner.

The shaft 15 and eyes 19 provide a swiveled or reciprocable connection for the said rocking member 16 to the disk 21, said disk being fixed to the housing of axle-shaft 22. The rocker 16 is adapted to rock in a reciprocating manner by the rotative movement of shaft 15 in eyes 19, fixed to disk 21, its movement in one direction being limited by block or stop 23 and in the opposite direction by block or stop 24.

Arm 12 passes through slot 25 in disk 21, the said slot being of sufficient length to allow motion of arm 12 in either direction when rocked at the same time and with shaft 15 and rocker 16.

Tongue 26 is arranged to ride upon the oppositely-disposed lips 17 and 18 of rocker 16. In the drawings, this tongue 26 is shown as bent outwardly and formed integrally with rod 27, but this is merely an illustrative construction, as the tongue 26 may be swaged or welded to rod 27 or some similar member or the form of the member composed of rod 27 and arm 26 may be varied, its essentials being two parts at substantially a right-angle to each other.

The member 27 supports head 28, the surface of the extremity of which is smooth and rounded, so as to minimize friction, as it is intended for constant contact with the side 29 of the inner tube 30 that is adjacent to the circumferential slot in the tire casing.

While the part 31 of the head 28 that comes in contact with the inner tube 30 is so smooth and rounded as practically to eliminate friction, yet, if desired, a reinforcement (not shown in the drawings) may be applied on the inner tube at the point of contact.

A leaf spring 32 (for which a coiled spring may be substituted) keeps rod or member 27 and head 28 pressed constantly toward the inner tube 30, so as to move toward the inner tube as the air-pressure diminishes in the inner tube 30.

When the tire contains the desired amount of air-pressure, the tongue 26 will be in contact with the lip 18 of rocker 16, but as the air-pressure in the tire decreases the spring 32 forces rod 27 and head 28 outward and tongue 26 into contact with the lip 17, which causes rocker 16 to rock and shaft 15 to rotate in the same direction, thereby moving or depressing arm 12, which draws wire 3 downwardly, thereby indicating on the scale 4 on the instrument-board less air-pressure in the tire.

With the rotation of the wheel, the tongue 26 rides out of contact with either of the lips 17, 18, but leaves the position of wire 3 relative to scale 4 unchanged. Because of the curved or slanting edge of the lips 17, 18, when the revolution of the wheel again brings tongue 26 into contact with lip 17 or 18 it assumes exactly the right position, allowing for any slight change in air-pressure in the meantime and any change in position of head 28 and tongue 26 due to the impulsion of spring 32.

If any noticeable or objectionable click is found when tongue 26 re-engages one of the lips 17, 18, that can be obviated by using a non-metallic substance of a smooth finish but non-clicking nature for the lips 17, 18, or the edges thereof or for the whole rocker 16.

Tongue 26 passes through slot 33 in the brake-drum 34. The said slot 33 is of sufficient length to allow movement of the tongue 26 up or down as the air-pressure in the inner tube increases or diminishes. Rod 27 passes through a similar slot 35 in hub-housing 36, so that rod 27 can make contact with the spring 32.

It will be obvious that many minor changes may be made in the form and arrangement of the several parts of this device without departing from the spirit of this invention or the scope of the following claims.

Having thus described this invention, what is claimed and desired to be secured by Letters Patent is:

1. In a device of the character described, the combination of a smooth and rounded head in contact with an inner tube, a member bearing the head and having a projection therefrom at substantially a right-angle thereto, a spring normally pressing the said member and thereby the said head into contact with the inner tube, a rockable member with which the said projection engages, a projection from the said rockable member, a wire connected with the said projection, and a scale with which the said wire is adapted to register.

2. In a device of the character described, the combination of a smooth and rounded head in contact with an inner tube, a member bearing the head and having a projection therefrom at substantially a right-angle thereto, a spring normally pressing the said member and thereby the said head into contact with the inner tube, a rockable member with which the said projection engages, a projection from the said rockable member, a wire connected with the said projection, and a scale with which one end of said wire is adapted to register, the said wire being contained within a flexible sheath intermediate its end portions.

3. In a device of the character described, the combination of a spring-pressed member in contact with an inner tube, a rockable member having curved lips, a projection from the said first-mentioned member adapted to make contact with one or the other of said lips dependent upon the amount of air-pressure within the said inner tube, a rotatable shaft upon which the rockable member is secured, a projection extending from said shaft, a flexible slidable member having one end secured to said projection, and a scale with which the other end of said slidable member is adapted to register.

4. In a device of the character described, the combination of a spring-pressed member in contact with an inner tube, a rockable member having curved lips, a projection from the said first-mentioned member adapted to make contact with one or the other of the said lips dependent upon the amount of air-pressure within the said inner tube, a rotatable shaft upon which the rockable member is secured, a projection extending from said shaft, a flexible slidable member having one end secured to said projection, and a scale with which the other end of said slidable member is adapted to register, the said slidable member being inclosed intermediate its ends in a flexible covering.

5. A tire-pressure indicator comprising yieldingly resisting means actuated by the air-pressure within an inner tube, a rocker actuated by the said means, an indicator scale, and a flexible and slidable wire actuated by the said rocker and adapted to register on the said indicator scale.

6. A tire-pressure indicator comprising yieldingly resisting means actuated by the air-pressure within an inner tube, a rocker actuated by the said means, an indicator scale, and flexible means actuated by the said rocker and adapted to register on the said indicator scale, there being a swiveled connection between the said rocker and the said flexible means.

7. A tire pressure indicator comprising a shiftable member adapted to be shifted by variation in pressure within an inner tube, an indicator scale, a flexible slidable wire adapted to register with said scale to indicate pressure, and means operatively connecting said shiftable member with said flexible wire for sliding the latter.

GEORGE F. HUTCHINGS.